Nov. 10, 1931. C. H. KIRBY 1,830,877
CARBURETOR
Filed July 3, 1924
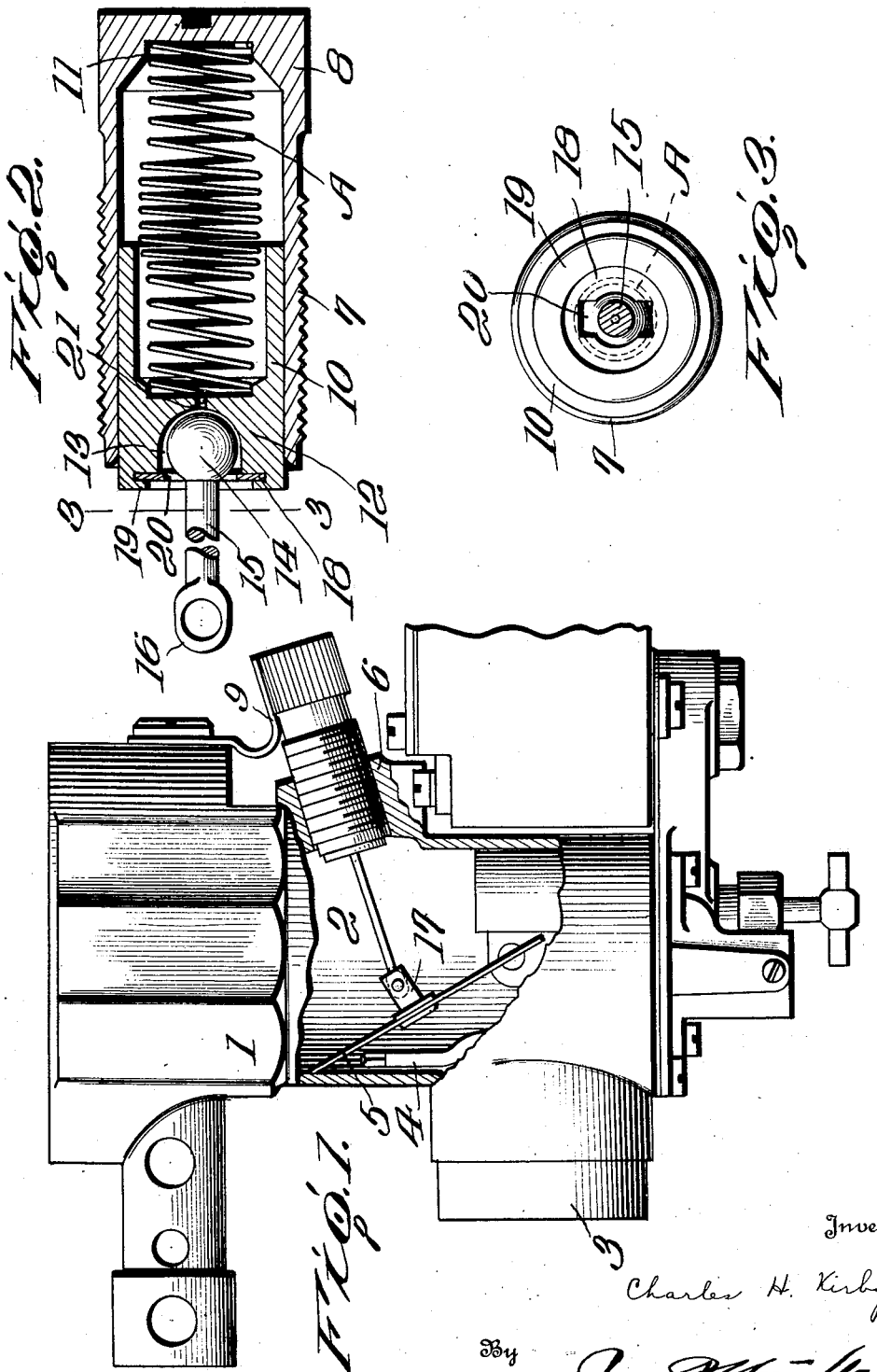
Inventor
Charles H. Kirby
By
Attorney Patented Nov. 10, 1931

1,830,877

UNITED STATES PATENT OFFICE

CHARLES H. KIRBY, OF FLINT, MICHIGAN, ASSIGNOR TO MARVEL CARBURETER COMPANY, OF FLINT, MICHIGAN, A CORPORATION OF INDIANA

CARBURETOR

Application filed July 3, 1924. Serial No. 724,053.

This invention relates to certain new and useful improvements in carburetors and more particularly to means for controlling the movement of the suction controlled valve, the object being to provide a screw with a sliding piston having a connection with the suction controlled valve so as to form a dash pot to retard the opening movement of the valve and to allow a free closing movement for a portion of its travel.

Another and further object of the invention is to provide a ball and socket connection between the piston and the valve in order to allow the piston to move freely without any danger of jamming when the valve is moving into open and closed position.

Other and further objects and advantages of the invention will be hereinafter set forth and the novel features thereof defined by the appended claims.

In the drawings,

Figure 1 is a side elevation of a carburetor, partly in section, showing the air valve and connecting means to the piston;

Figure 2 is a longitudinal section through the adjusting screw and piston showing the connecting rod in elevation; and Figure 3 is a section taken on line 3—3 of Figure 2.

In the drawings 1 indicates a body of a carburetor which is provided with a mixing chamber 2 having a lateral air inlet 3, high speed nozzle 4 and a pivoted suction controlled valve 5. The carburetor is provided with a low speed nozzle (not shown) and the construction of carburetor herein shown and described is a well known type of Marvel carburetor now in general use.

One wall of the mixing chamber is provided with a threaded apertured boss 6 in which is mounted a hollow threaded screw 7 provided with a milled head 8 adapted to be engaged by a spring 9 for holding the screw in its adjusted position. Slidably mounted within the hollow screw 7 is a hollow piston 10, the circumference of which is machined to fit the hollow screw as clearly shown in Figure 2.

The head 8 is provided with a socket 11, in which one end of a coil spring A is seated the other end of the spring extending into the hollow piston 10 so as to clearly hold the piston in extended position.

The hollow piston 10 is provided with a head 12 having a conical socket 13 in which is disposed a spherical ball 14 formed on the end of a connecting rod 15, the other end of which is flattened and apertured as shown at 16 and is adapted to be pivotally mounted in a bifurcated ear 17 secured to the pivoted suction controlled valve 5 whereby the movement of the suction controlled valve forces the piston into the adjusting screw against the tension of the spring disposed therein so as to retard the opening movement of the suction controlled valve.

The ball 14 on the connecting rod 15 is secured within the socket 13 by a disc 18 which is secured in place by upsetting the edge of the piston as shown at 19. The disc 18 is provided with a slot 20 through which can be extended the flattened end 16 of the connecting rod.

In assembling the piston and connecting rod, the disc 18 is placed over the flattened end of the connecting rod and then forced into position over the socket 13 of the head of the piston so as to lock the ball head within the socket in order to form a universal connection between the connecting rod and piston so that the suction controlled valve is allowed to move freely without any danger of binding.

The bottom of the socket 13 is provided with a passage 21 communicating with the interior of the hollow piston, said passage being closed by the ball 14 when the valve 5 is moving into open position and opened when the valve is moved into closed position.

This provides a construction of combined adjusting screw and dash pot for the suction controlled valve whereby a slow inward movement of the piston and a quick outward movement is secured, as when the valve is moved into open position, the air port is closed by the valve formed by the socket and ball, so that air is compressed within the adjusting screw and when moving into closed position, the air port is opened so as to allow the spring to force the suction controlled valve back quickly.

While in the drawings I have shown certain details of construction, I do not wish to limit myself to any particular construction, of connecting the suction controlled valve to the piston as my invention consists broadly in providing an adjusting screw with a sliding piston having a valve controlled port, which is closed by the connecting rod when the suction controlled valve is moved into open position and is opened when the suction controlled valve is moved into closed position.

I am aware that various changes can be made in the construction shown without departing from the spirit of my invention as clearly defined by the following claims.

I have found in practice that by connecting up the air valve in this particular manner that the piston relief valve functions on a portion of its return movement during the period of low spring pressure when the gravity of the valve member is in excess of the spring pressure so as to provide a relief valve for the piston at the period where the greatest amount of pulsation occurs.

What I claim is:—

1. In a device of the kind described having an air passage, a pivoted suction controlled valve mounted in said passage adapted to move into closed position by gravity, of a hollow adjusting screw mounted in the wall of the air passage of said device, a hollow piston working in said screw forming a dash pot chamber, said piston having a head at its outer end provided with a substantially semi-spherical socket, said head having an air passage in communication through the end wall of said socket with the dash pot chamber, a coil spring disposed within said chamber for moving said piston outwardly in said chamber and a connecting rod extending from said suction controlled valve having a spherical head mounted in said socket to form a universal connection between said rod and said piston, said spherical head forming a valve for closing the air passage of said dash pot chamber on the opening of said suction controlled valve for increasing the resistance to the opening of said suction controlled valve.

2. In a device of the kind described, a pivoted suction controlled valve having a bifurcated ear, said valve being adapted to move into closed position by gravity, a tubular adjusting screw mounted in the wall of said device, a hollow piston mounted in said screw having a head provided with a semi-spherical socket, said head having an air passage extending from said socket to the interior of said piston, a connecting rod pivotally mounted in the ear of said valve, said rod having a spherical head mounted within the socket forming a ball and socket connection between said rod and said piston, said head forming a valve for closing the air passage leading to said adjusting screw for increasing the resistance to the opening movement of said suction controlled valve.

3. In a device of the kind described, the combination with a pivoted suction controlled valve, said valve being adapted to move into closed position by gravity, a hollow adjusting screw mounted in said device, a hollow piston mounted in said screw forming with said screw a dash pot chamber, said piston having a head provided with a semi-spherical socket, said head having an air passage in communication with said dash pot chamber from said socket, a spring disposed in said screw for resisting the initial movement of said piston, a rod pivotally connected to said suction controlled valve provided with a spherical head mounted in said socket, an apertured disc arranged over said socket in which said rod passes, the edges of said piston being upset for securing said disc to said head, said spherical head being adapted to close said air passage upon the opening movement of said suction controlled valve for increasing the resistance to the opening movement thereof and to open said air passage on the final closing movement of said valve.

4. In a device of the kind described, a pivoted suction actuated valve, a tubular adjusting screw mounted in the wall of the device, a piston slidably mounted in said screw forming a dash pot chamber in said screw, said piston being provided with a semi-spherical socket having an air passage communicating with said dash pot chamber, a rod pivotally connected to said suction actuated valve having a spherical head mounted in said semi-spherical socket forming a ball and socket joint between said pivoted suction controlled valve and said slidably mounted piston, a spring arranged in said dash pot chamber for resisting the opening movement of said suction actuated valve, said spherical head being adapted to close the air passage to said dash pot chamber upon the opening of said suction actuated valve for increasing the resistance to the opening thereof.

In testimony whereof I hereunto affix my signature.

CHARLES H. KIRBY.